Sept. 25, 1928.
A. L. COLLINS, SR
RAIL JOINT
Filed Nov. 11, 1925
1,685,704
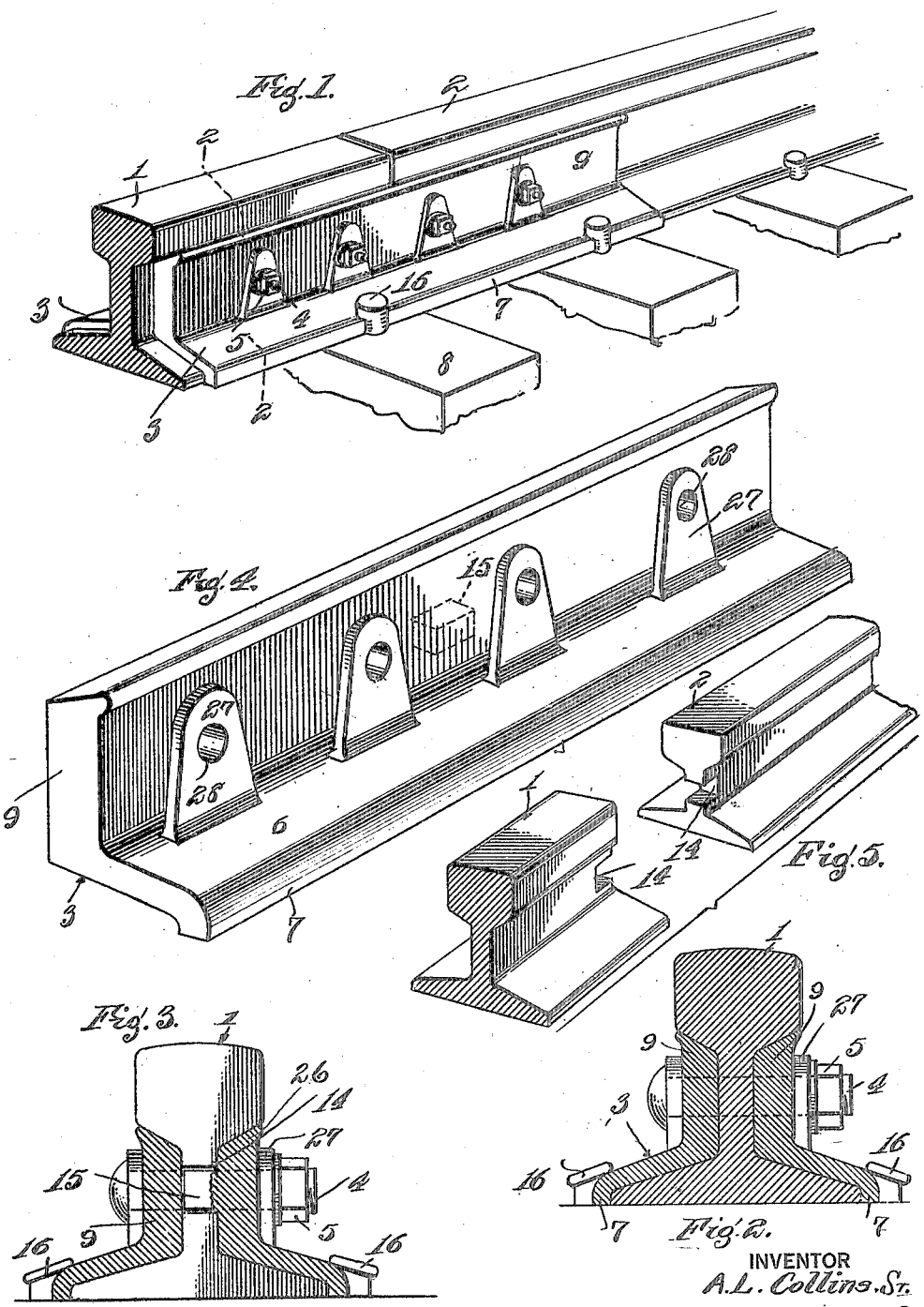
INVENTOR
A.L. Collins, Sr.
BY
ATTORNEY Patented Sept. 25, 1928.

1,685,704

UNITED STATES PATENT OFFICE.

ABRAHAM LINCOLN COLLINS, SR., OF AMITE, LOUISIANA.

RAIL JOINT.

Application filed November 11, 1925. Serial No. 68,380.

My invention relates to improvements in rail joints, and it consists in the combinations, constructions and arrangements herein described and claimed.

An object of the invention is to provide a strong and durable rail joint which affords facilities for connecting the meeting end portions of adjacent rails so that such rails will be substantially rigid with each other and will be stayed to each other.

A further object of the invention is the provision in a rail joint of novel splice or fish plates for connecting the meeting end portions of the rails and adapted to be clamped to the base flanges of the rails by spikes which thus serve to clamp the fish plates and the meeting end portions of the rails as a unit against displacement from the supporting ties.

Other objects and advantages of the invention will be apparent from the following description, considered in conjunction with the accompanying drawings, in which Figure 1 is a perspective sectional view showing a rail joint embodying the invention, Figure 2 is a section substantially along the line 2—2 of Figure 1, Figure 3 is a transverse section through the rail joint, the section being taken between the ends of the connected rails, Figure 4 is a perspective view of one of the fish plates of the rail joint, Figure 5 is a fragmentary perspective view showing the meeting end portions of two of the rails.

In the drawings, the numerals 1 and 2 respectively designate two aligned rails. The meeting end portions of these rails may be spliced or coupled together by a pair of fish plates 3, bolts 4 and nuts 5 as shown in Figures 1 and 2 of the drawings. Each of the fish plates 3 is angular in cross sectional contour and comprises a base flange 6 which is adapted to rest on aligned base flanges of the meeting end portions of the rails 1 and 2 and to extend downwardly at 7 over the outer edges of said aligned base flanges of the meeting end portions of the rails so that the outer edge of the base flange 6 of the fish plate 3 terminates close to the plane of the upper faces of the supporting ties 8 on which the rails 1 and 2 rest. The fish plate 3 also includes a clamping flange 9 having the inner face thereof disposed flatwise against the adjacent faces of the web portions of the meeting end portions of the rails 1 and 2. The clamping flange 9 is relatively thick for the greater part of its length from its juncture with the base flange 6.

The rails 1 and 2 are formed with registering notches 14 in the meeting ends of the web portions thereof. When the fish plates 3 are formed with an even number of spaced openings for the reception of the connecting bolts 4, as shown, one of the fish plates may be formed with a lateral lug 15 intermediate the length of that fish plate for entering and engaging with the registering notches 14, thus aiding in locking the fish plates to the rails and in producing a substantially rigid structure. When an odd number of the spaced openings are provided in the fish plates for the reception of the bolts the lug 15 may be omitted since the middle bolt which connects the fish plates will extend through and engage with the registering notches 14.

From the foregoing description of the various parts of the device, the operation thereof may be readily understood. A pair of the fish plates 3 are arranged in clamping relation to the meeting end portions of the rails 1 and 2 and are connected to each other and held in clamping relation to the meeting end portions of the rails by the bolts 4 and the nuts 5, the bolts extending through the aligned openings in the fish plates and in the web portions of the meeting end portions of the rails. The heads of track spikes 16 which are driven into the ties 8 bear against the outer edge portions of the base flanges 6 of the fish plates and not only clamp the fish plates to the meeting end portions of the rails but tend to hold the fish plates and the meeting end portions of the rails secured firmly to the ties. A strong, durable and rigid rail joint thus will be produced.

The fish plate is best seen in Fig. 4 and is designated generally 3, being formed with integral lug-like enlargements 27 on the outer face thereof at spaced intervals along its length. Each of the enlargements 27 is merged at its lower end into the base portion 6 and at its inner side into the clamping flange 9 which thus is thickened at intervals along its length. The enlargement 27 terminates below the level of the upper end of the clamping flange 26 which engages under the adjacent portions of the heads of the meeting end portions of the rails and is of such thickness that the outer face thereof is flush with the outer faces of the adjacent portions of the heads of the meeting end portions of the rails. Transverse openings 28 extend through the thickened portions of the clamping flange or fish plate 3. These openings 28 are adapted for the reception of the bolts 4 when a pair of the fish plates 3 are employed to connect the meeting end portions of the rails 1 and 2.

I claim:—

In a rail joint, two alined rails having registering notches in the meeting ends of the web portions thereof, a pair of fish plates disposed against opposite sides of the meeting end portions of said rails, said fish plates having laterally enlarged portions provided with transverse openings said enlarged portions extending down the web of the fish plate to its base and being larger at the bottom portion than at the top and the web portions of said rails having transverse openings alined with the openings of the fish plates, fastening devices extending through said alined transverse openings and clamping said fish plates to the rails, the portions of the fish plates which extend past the line of juncture between the rails being imperforate, and a solid lateral lug on the imperforate portion of one of said fish plates entering and engaging with said registering notches in the meeting ends of the rails, said fish plates having down turned flanges at their outer edges abutting the edges of the base flanges of the rails.

ABRAHAM LINCOLN COLLINS, Sr.